United States Patent [19]
Maeda et al.

[11] Patent Number: 5,978,668
[45] Date of Patent: Nov. 2, 1999

[54] RADIO COMMUNICATION APPARATUS

[75] Inventors: Satoru Maeda; Masaru Nonogaki, both of Kanagawa, Japan

[73] Assignee: Sony Corporation, Tokyo, Japan

[21] Appl. No.: 08/897,633

[22] Filed: Jul. 21, 1997

[30] Foreign Application Priority Data

Jul. 31, 1996 [JP] Japan ................................. 8-202659

[51] Int. Cl.[6] ................................................ H04M 1/66
[52] U.S. Cl. ........................................ 455/410; 455/419
[58] Field of Search ................................. 455/410, 411, 455/40, 423, 422, 424, 425, 426, 515, 421, 463, 464, 417, 461, 420, 419

[56] References Cited

U.S. PATENT DOCUMENTS

| 5,673,308 | 9/1997 | Akhavan .................................. 455/417 |
| 5,745,850 | 4/1998 | Aldermeshian et al. ................ 455/417 |
| 5,873,033 | 2/1999 | Hjern et al. .............................. 455/417 |

FOREIGN PATENT DOCUMENTS 0264092  10/1987  European Pat. Off. ......... H04M 3/42
2198910   6/1988  United Kingdom ............ H04M 3/42

OTHER PUBLICATIONS

Baugh, Why wait for PCS? Personalized portable telephone services are here today, Telecommunications, pp. 41–44, Mar., 1994.

*Primary Examiner*—Reinhard J. Eisenzopf
*Assistant Examiner*—Charles N. Appiah
*Attorney, Agent, or Firm*—Jay H. Maioli

[57] ABSTRACT

A communication method and a communication apparatus, in which a terminal can be selected in accordance with a specific application, and the abuse thereof can be prevented in the case of terminal being stolen or lost. When a terminal is connected to a predetermined communication network by using an identification code assigned to each terminal, a specific identification code assigned to a first terminal can be set to a predetermined second terminal by a predetermined operation. The first terminal can not use the above-mentioned specific identification code which is set in the second terminal.

7 Claims, 7 Drawing Sheets

RADIO COMMUNICATION APPARATUS

BACKGROUND OF THE INVENTION

The present invention relates to a communication method and a communication apparatus suitably applicable to a radio telephone apparatus usable as a terminal of a radio telephone system called a personal handy phone system (PHS), for example.

A telephone apparatus called a cordless telephone is configured of a plurality of telephone sets. The cordless telephone includes a base unit connected to a cable telephone line and one or a plurality of handset units for performing a radio communication with the base unit. Each handset unit is adapted to communicate with a telephone set connected to the telephone line through the base unit. Also, some cordless telephone apparatuses permit extension between the base unit and handset units (or extension between a plurality of handset units).

The telephone apparatus configured as such a cordless telephone has comparatively many improved functions offered as conveniences to individual telephone sets. The telephone apparatus has the function of an answering machine, for example, which can automatically answer a call arriving at a person who is not at home. Other telephone apparatus include a plurality of one-touch dial keys for transmitting a message to specific parties in registration to facilitate the transmission to such parties with which the caller has frequent conversations.

A handset unit making up the cordless telephone apparatus is usable as a portable telephone set (hereinafter called a PHS terminal) for a communication network system called the personal handy phone system (PHS). For the PHS, there are located a plurality of base stations arranged at a predetermined spatial interval with each other and connected to the telephone line. Each base station can communicate by a radio wave with PHS terminals existing in a service area of several hundred meters in radius of the particular base station. The PHS terminals located within the service area can transmit a message to an arbitrary party and receive a call from an arbitrary party through the base station.

In the case where a handset unit for the cordless telephone has the function of a PHS terminal, the same scheme is generally employed for the communication with the base station as for the communication with the base unit for the cordless telephone system thereby simplifying the circuit configuration of the handset units.

In this way, the handset units making up the cordless telephone system can be used also as a PHS terminal. As a result, in an indoor operation mode permitting a handset unit to have a communication with the base unit from a home, for example, the handset unit can be used as a cordless telephone set, while in a public mode where it can be used outdoor as a PHS terminal, thus conveniently widening the range of applications as a telephone set.

The handset unit of the cordless telephone system preferably has arranged thereon comparatively many keys to make possible a comparatively complex operation in order to realize multiple functions required as a cordless telephone. A PHS terminal which is routinely carried as a portable telephone, on the other hand, is preferably as small in size and light in weight as possible. In the case where a single terminal is used both as a handset unit of the cordless telephone and a PHS terminal, the process of selection is required for the terminal to have a multiple function as a telephone set of ordinary size or to be reduced in size with a limited function.

It is thought that this inconvenience can be obviated by providing two terminals and selectively using them according to specific applications, one having a multiple function and constructed in a size convenient to use as a handset unit of the cordless telephone system and the other having a size convenient to use as a PHS terminal. In such a case, each of the two terminals is registered in the communication network side as a PHS terminal, and therefore the basic rate covering two units is required to be paid. The user, therefore, is burdened with an increased cost. Also, since each PHS terminal is basically assigned a different telephone number, the two telephone sets have different telephone numbers. It is thus inconveniently impossible for the two terminals to serve a single call arriving in the PHS mode at the same time.

Further, in view of the fact that the PHS terminal is generally configured in a small size and carried by a user, it is liable to be lost or stolen when the user is out with the PHS terminal. For example, a third party who picked up the lost PHS terminal may abuse it (i.e., a person other than the owner of the PHS terminal may use it for communication with other parties). Under the present circumstances, no means is available for preventing such an abuse.

As the radio telephone system, there is available such a system in which personal identification information such as a telephone number, an identification code and so on are stored in an IC card, and a terminal having the IC card mounted thereon functions as a telephone set assigned the particular telephone number. In this system, the IC card is mounted on a small-sized portable terminal on one occasion, and the IC card is mounted on a multiple-function terminal on another occasion, thereby making it possible for a plurality of terminals to share the same telephone number and to use it. Even in such a system, however, the problem still remains that the IC card may be abused by a third party when it is lost or stolen.

SUMMARY OF THE INVENTION

In view of such an aspect, an object of the present invention is to provide a communication method and a communication apparatus in which terminals can be selected according to specific applications and the abuse in case of it being stolen or the like can be avoided.

According to one aspect of the present invention, there is provided a radio communication apparatus comprising first and second radio terminals. The first radio terminal includes a first memory for storing identification code data used for connecting to a predetermined communication network and first control means for reading the above identification code data from the first memory in accordance with the operation of operating means and transmitting it by transmission means. The second radio terminal includes a second memory and second control means for receiving the identification code data received by receiving means and storing it in the second memory. When the identification code data is stored in the second memory of the second radio terminal, the second radio terminal can be connected to the predetermined communication network whereas the connection of the first radio terminal to the predetermined communication network is prohibited.

According to the radio communication apparatus of the invention, the same identification code assigned to the first terminal can be assigned to the second terminal to connect the second terminal to a predetermined communication network. Thus it is possible to use an arbitrary one of the terminals according to a specific application.

BRIEF DESCRIPTION OF THE DRAWINGS

FIGS. 4A and 4B are flowcharts showing the process of an ID exchange according to the embodiment;

DESCRIPTION OF THE PREFERRED EMBODIMENT

An embodiment of the present invention will be described below with reference to the accompanying drawings.

Figure 1:
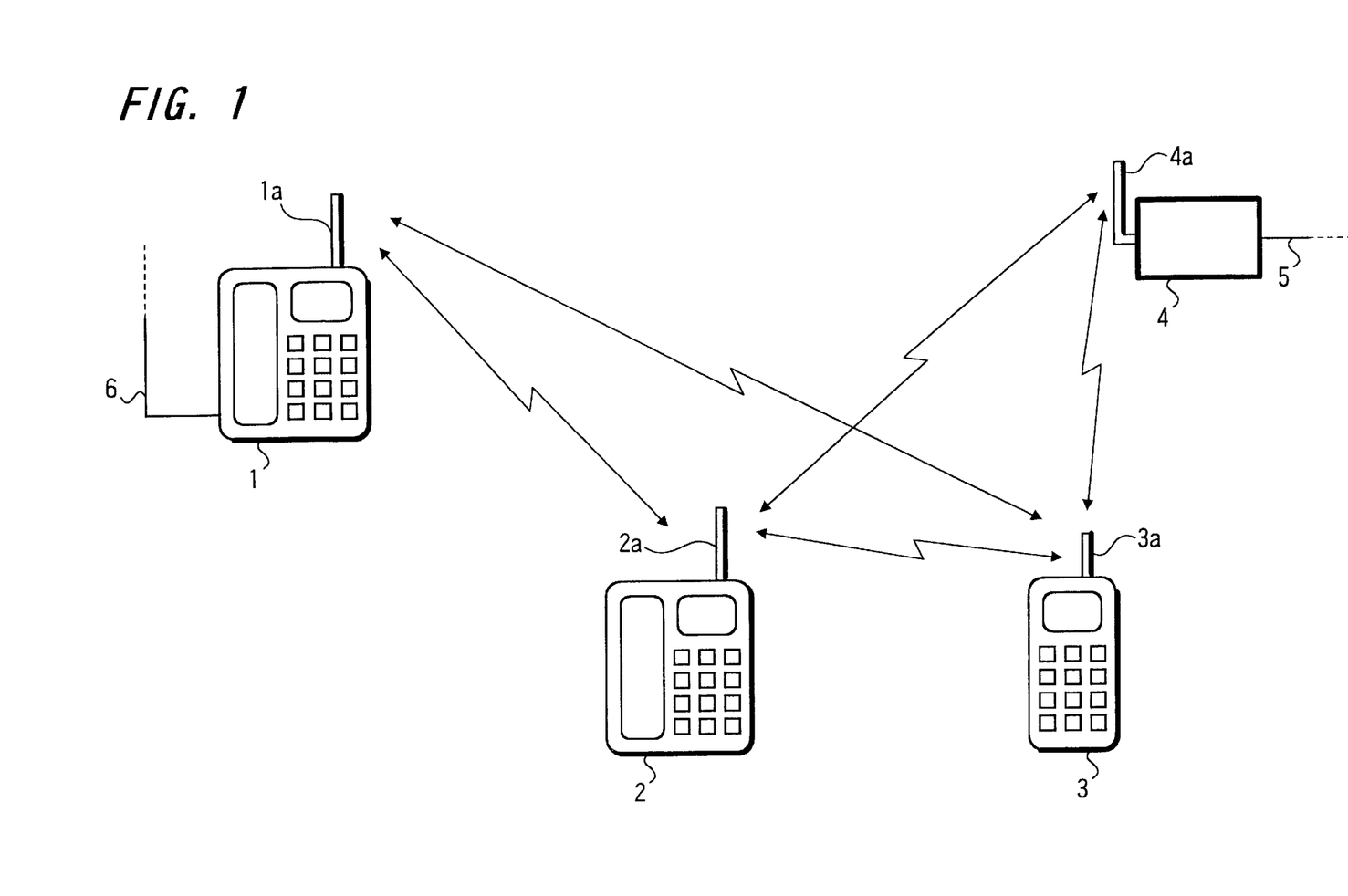
FIG. 1 is a diagram showing a system configuration according to an embodiment of the invention.

First, a system configuration to which the present embodiment is applicable will be explained with reference to FIG. 1. In the case of this embodiment, the present invention is applied to a cordless telephone apparatus. Each handset unit making up the cordless telephone apparatus has the function of operating as a PHS terminal connectable to a radio telephone system called a personal handy phone system (PHS). Specifically, the cordless telephone apparatus according to this embodiment comprises a base unit 1 connected to a subscribed telephone line 6 and two handset units 2, 3 each for carrying out a radio communication with the base unit 1.

The base unit 1 and the handset units 2, 3 are adapted to transmit and receive a radio signal through antennas 1a, 2a, 3a connected to them, respectively. The radio communication between the base unit 1 and the handset unit 2 permits transmission of an outgoing call to the subscribed telephone line 6 from the handset unit 2 through the base unit 1. The radio communication between the base unit 1 and the handset unit 3, on the other hand, makes it possible to transmit an outgoing call to the subscribed telephone line 6 from the handset unit 3 through the base unit 1. Also, the radio communication by extension is also possible between the base unit 1 and the handset unit 2, between the base unit 1 and the handset unit 3, and between the handset unit 2 and the handset unit 3. This radio communication between the base unit 1 and the handset units 2, 3 as a cordless telephone is accomplished by each party recognizing the other party using an identification data set common to the base unit 1 and the handset units 2, 3 as the cordless telephone apparatus. The ID exchange process between the handset unit 2 and the handset unit 3 described later is executed by transmitting control data directly during the communication in extension mode (or by another transmission process different from the extension mode).

According to this embodiment, the handset unit 2 is configured as a telephone set having comparatively many functions with many keys arranged thereon or the like. Specifically, it is used as a fixed unit (which can be moved, however, as it is not directly connected to the telephone line) having a specified place for its installation. The handset unit 3, on the other hand, is a comparatively small telephone set convenient to carry and is used as a non-fixed unit. Nevertheless, the handset units 2 and 3 may have the same configuration.

The handset unit 2 is made to be usable as a PHS terminal. Specifically, the handset unit 2 is previously registered in a common carrier offering a PHS service, who has in registration an identification code (PHS ID) set for the particular handset unit 2. When a signal is transmitted as a PHS terminal, the handset unit 2 carries out an outgoing call as a public mode. Then, individual PHS ID data unique to each terminal is transmitted together with the transmission control data to a public base station 4 installed in the neighborhood of the handset unit 2 through its antenna 4a, so that the handset unit 2 is connected to another party through a public telephone line 5 connected to the public base station 4. Also, when the arrival control data assigned the PHS ID of the handset unit 2 is transmitted from the public base station 4, the handset unit 2 decides that it has been called as a PHS terminal and processes the arriving data.

The process as a PHS terminal described above, however, is a generally well-known process performed when a handset unit for the cordless telephone apparatus is used as a PHS terminal. The remaining various processes (such as a position registration process or the like) required as a PHS terminal, though not explained herein, are also executed in a manner similar to the prior art PHS terminal.

According to the present invention, the PHS ID assigned to the handset unit 2 is temporarily transferred to the handset unit 3, and the handset unit 3 can be used as a PHS terminal. The process required in the handset unit 2 for transferring the PHS ID to the handset unit 3 is executed under the control of a central processing unit built in the handset unit 2. The control process will be described later.

Figure 2:
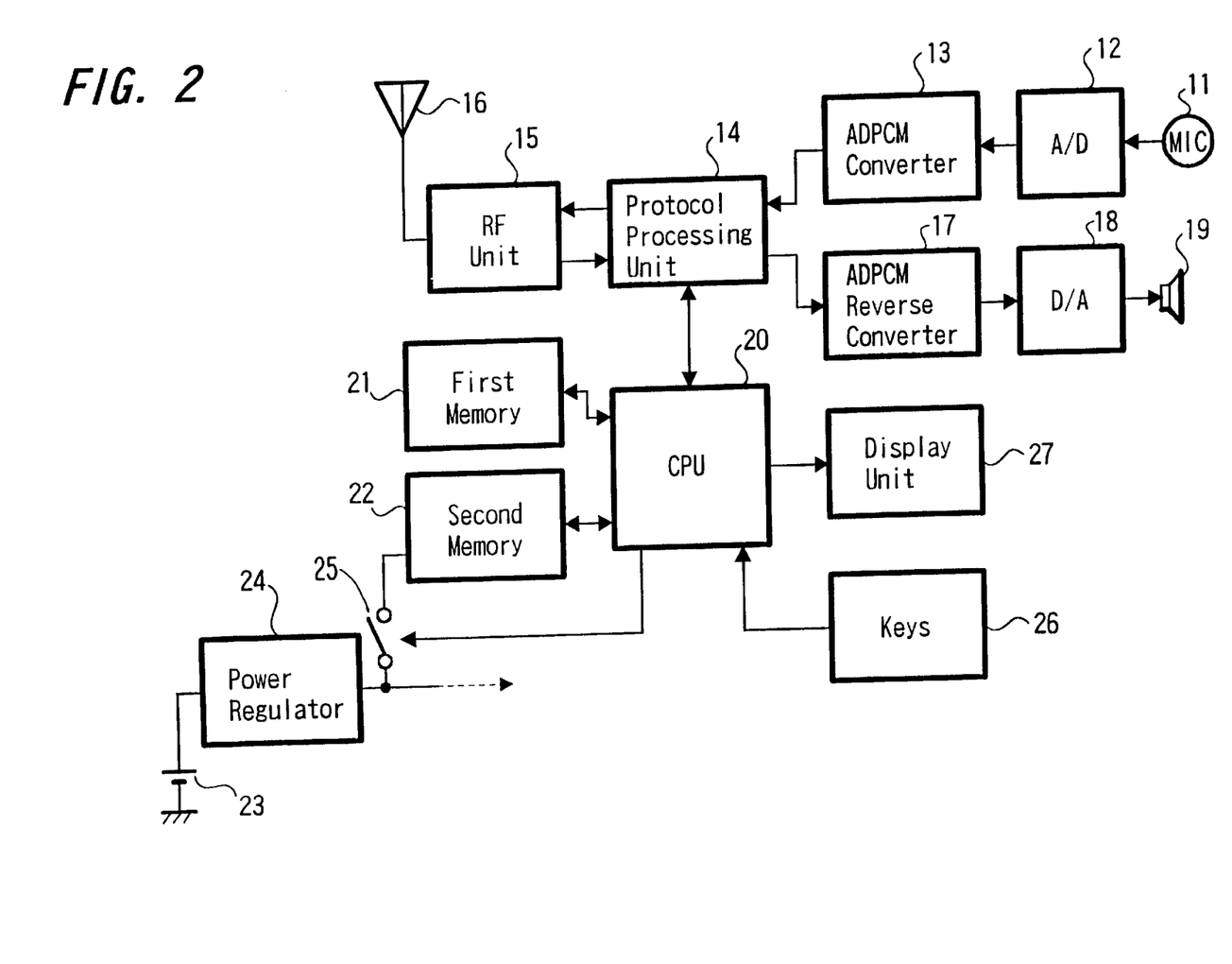
FIG. 2 is a block diagram showing a configuration of a terminal according to the embodiment.

Now, an arrangement of the handset units 2 and 3 will be explained with reference to FIG. 2. The handset units 2 and 3 have the same basic configuration of internal circuits. FIG. 2 shows the arrangement common to both the handset units 2, 3. First, description is made on a transmission system. The audio signal collected by a microphone 11 is converted into digital audio data by an analog/digital converter 12, and the digital data thus converted is compressed and encoded in an ADPCM conversion circuit 13. The data thus compressed and encoded is applied to a protocol processing section 14. The protocol processing section 14 generates transmission burst data having a predetermined slot configuration under the control of a central processing unit (CPU) 20 configured of a microcomputer. In the burst data there are located the audio data supplied from the ADPCM conversion circuit 13 and arranged at a predetermined time position, the control data supplied from the central processing unit 20 and other fixed patterns such as predetermined sync data or the like arranged at a predetermined time position therein.

The transmission burst data generated at the protocol processing section 14 is applied to a radio-frequency processing section (RF processing section) 15 for performing a transmission modulation by a phase modulation called a $\pi/4$ shift DQPSK. The signal thus modulated is converted into a predetermined transmission frequency and radio-transmitted from an antenna 16.

Now, a receiving system will be explained. The signal of a predetermined frequency received by way of the antenna 16 is converted into an intermediate frequency signal at the radio-frequency processing section 15 which demodulates the intermediate frequency signal to provide a baseband signal. The baseband signal thus produced by the receiving process is applied to the protocol processing section 14, where receiving burst data is extracted. Audio data contained in the receiving burst data is applied to an ADPCM reverse conversion circuit 17 which reverse-converts the audio data compressed and encoded into the audio data of the original sampling rate. The audio data thus reversely converted is applied to a digital/analog converter 18 to be converted into an analog audio signal thereby. The analog audio signal is applied to a speaker 19 and emitted as a sound. At the same time, the control data contained in the receiving burst data obtained at the protocol processing section 14 is supplied to the central processing unit 20 to perform the corresponding operation control.

The central processing unit 20 is connected with a first memory 21 and a second memory 22 as operation control memories. The first memory 21 is a nonvolatile memory into and from which data can be written and read electrically but which requires no electric power for holding the data. The second memory 22 is a memory requiring electric power and refresh operation for holding and writing/reading the data. Specifically, a power output from a battery 23 (or a DC power supply converted from an AC power supply) providing the power supply for the terminal is supplied to a power regulator 24 thereby to obtain a predetermined power source voltage VDD required as a stable power supply for the terminal. The power source voltage VDD is applied to each circuit in the terminal as an operation electric power. In this case, the second memory 22 is applied with the power source voltage VDD through a connection switch 25. The connection switch 25 is controlled in its on or off state by the central processing unit 20. As long as the connection switch 25 is closed or turned on and the power source voltage VDD is supplied, the second memory 22 performs the refresh operation and holds the stored data.

This refresh operation is also performed by a pulse generated by dividing the frequency of an operation clock of the central processing unit 20. Accordingly, when the operation of the central processing unit 20 is stopped by turning off the supply of the clock, the refresh operation is suspended and the data stored in the second memory 22 is lost.

In the case where a terminal having the configuration shown in FIG. 2 is used as the handset unit 2 usable as a PHS terminal, the PHS ID data assigned from a common carrier as a PHS terminal is stored in the first memory 21. This storage operation is performed by the common carrier side. Also, data of an identification code, i.e., a handset unit identification code (PT ID) required as a handset unit of the cordless telephone apparatus (such as a common identification code common to the base and handset units and an identification code unique to each handset unit specifying the slot number or the like of each handset unit as the cordless telephone) is stored in advance in the first memory 21 of each of the handset units 2, 3. Further, in the case where the terminal having the configuration shown in FIG. 2 is used as the handset unit 3 usable as a PHS terminal, the PHS ID data transferred from the handset unit 2 is stored in the second memory 22. The storage process therefor will be described later.

In the handset unit according to this embodiment, the operation information generated by a plurality of keys 26 for the telephone is supplied to the central processing unit 20 thereby to perform the operation for transmission and receiving or the like as well as the mode-setting operation. Also, the telephone number, the operation mode or the like entered or selected by the use of the keys 26 are displayed on a display unit 27 under the control of the central processing unit 20. This display unit 27 is configured of a liquid crystal display panel, for example.

Figure 3:
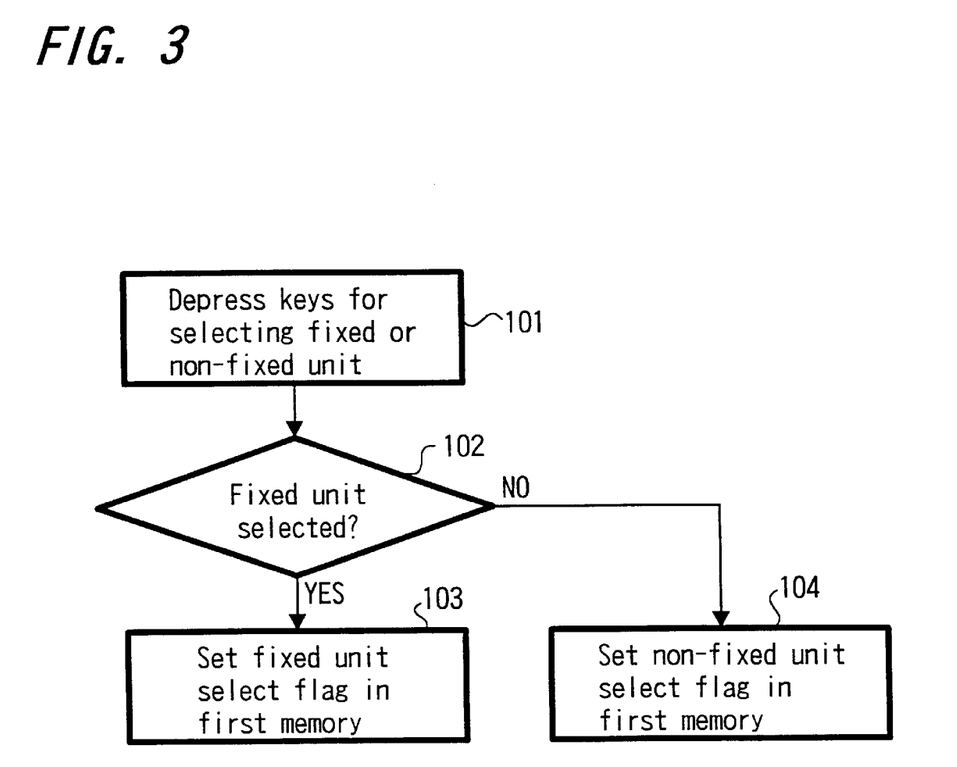
FIG. 3 is a flowchart showing the process of definition of a fixed unit and a non-fixed unit according to the embodiment.

Now, the process of exchanging an identification code between the two handset units 2, 3 making up the cordless telephone apparatus will be explained with reference to a plow chart of FIG. 3 and subsequent flowcharts.

The process for selecting the handset units 2, 3 as a fixed unit and a non-fixed unit, respectively, will be explained with reference to the flowchart of FIG. 3. Keys of the keys 26 of the handset units 2, 3 for selecting them as a fixed unit and a non-fixed unit are operated (step 101), and the central processing unit 20 decides whether or not the operation has been performed for selecting the handset units 2, 3 as a fixed unit (step 102). In the case where a handset unit is selected as a fixed unit, a fixed unit select flag is set in the nonvolatile first memory 21 which is a nonvolatile memory (step 103). In the case where the decision in step 102 is that a handset unit is not selected as a fixed unit (i.e., selected as a non-fixed unit), on the other hand, a non-fixed unit select flag is set in the first memory 21 (step 104). In the description that follows, it is assumed that the handset unit 2 is selected as a fixed unit and the handset unit 3 is selected as a non-fixed unit.

Figure 4B:
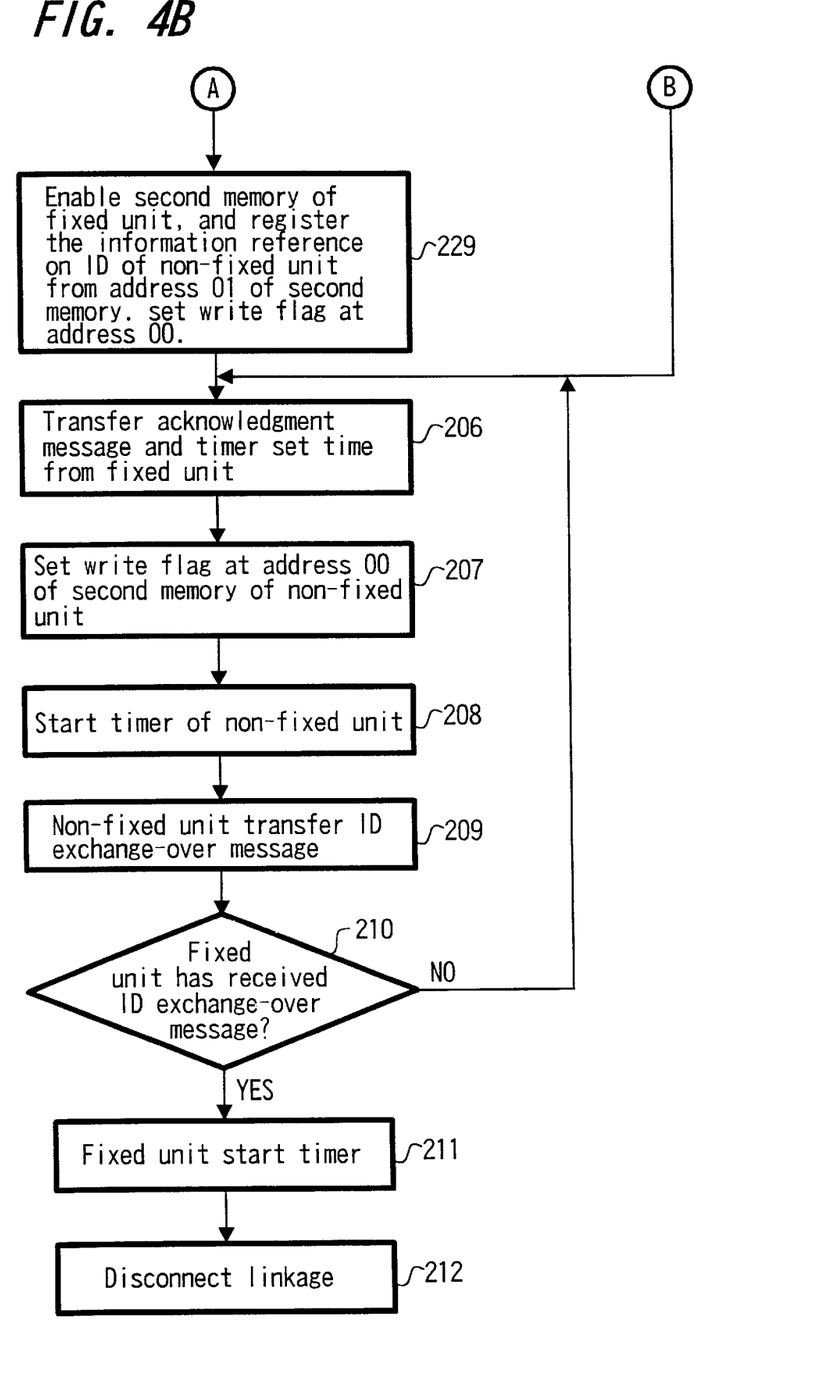

The process for transferring the PHS ID set for the handset unit 2 to the handset unit 3 and making the handset unit 3 usable as a PHS terminal will be explained with reference to the flowcharts of FIGS. 4A and 4B. In the flowcharts of FIGS. 4A, 4B and subsequent diagrams, the identification code is designated as an ID.

First, when it is judged whether or not a key is operated for transferring the PHS ID in the handset unit 2 and it is decided that the key has been operated (step 201), it is judged whether or not a write complete flag (which indicates that the flag is already written) is set at a predetermined address ("00" in this case) of the second memory 22 (step 202). In the case, when the decision is that no write complete flag is set, the unique number (handset unit number, which is called a handset unit slot number herein) set in the handset unit 3 is requested by the handset unit 2 (step 221). The keys of the handset unit 2 are operated to specify a slot number of a handset unit used by the user as a PHS terminal while at the same time specifying a time-out period for which the PHS ID exchange remains effective (step 222).

Upon specification of the slot number of the handset unit 3 and the time-out period by key operation, the central processing unit 20 of the handset unit 2 requests the handset unit 3 to perform a linkage for radio transmission of data (step 223). Upon establishment of linkage as a response is received from the corresponding handset unit 3 (step 224), a ID exchange request data is transmitted from the handset unit 2 (step 225).

When the handset unit 3 receives the ID exchange request data, the second memory 22 of the handset unit 3 is enabled, and the PHS ID of the handset unit 2 for which the linkage is established is stored and registered from an address 01 of the second memory 22 of the handset unit 3 (step 226). The handset unit 3 then transmits an ID exchange request acceptance message (step 227). The handset unit 2 judges whether the ID exchange request acceptance message has been received or not (step 228). In the case where the ID exchange request acceptance message cannot be received, the process returns to the ID exchange request transfer of step 225.

In the case where the ID exchange request acceptance message has been received by the handset unit 2 in step 228, on the other hand, the second memory 22 of the handset unit 2 is enabled, so that the PT ID of the handset unit 3 under linkage establishment is stored and registered from an address 01 of the second memory 22 of the handset unit 2. Also, the write complete flag is set at an address 00 of the second memory 22 of the handset unit 2 (step 229) (see FIG. 4B).

Then, the handset unit 2 sends an acknowledgment message and data of a timer set time to the handset unit 3 (step 206), and the write complete flag is set at an address 00 of the second memory 22 of the handset unit 3 (step 207).

Upon complete execution of the above-mentioned steps, a timer arranged in the central processing unit 20 of the handset unit 3 is started (step 208). At this time, the timer is operated to count up to the time specified in step 206. As this timer operation starts, the handset unit 3 transmits an ID exchange-over message (step 209). The handset unit 2 judges whether the ID exchange-over message could be received or not (step 210). In the case where the ID exchange-over message could be received, the handset unit 2 also starts a timer incorporated in the central processing unit 20 (which timer is adapted to count the same time period as the time set in the handset unit 3) thereof (step 211), after which the linkage with the handset unit 3 is cut off thereby to complete the ID exchange process (step 212).

In the case where the ID exchange-over message cannot be received in step 210, the process returns to step 206.

If it is decided in step 202 that the write complete flag is set at the address 00 of the second memory 22 of the handset unit 2, it indicates that the ID has already been exchanged by the above-mentioned process. In that case, only the time-out period is reset in the handset unit 3 that has already exchanged the ID. Specifically, the process is passed to step 203 in which the handset unit 3 already registered is automatically selected and only the time-out period is entered since the same ID cannot be assigned to a plurality of handset units. Upon entry operation of the time-out period, a linkage is requested from the handset unit 2 to the handset unit 3 already in registration (step 204). Upon establishment of the linkage with the handset unit 3 (step 205), the process proceeds to step 206 for transmitting the acknowledgment message and the timer set time data from the handset unit 2 to the handset unit 3.

Figure 5:
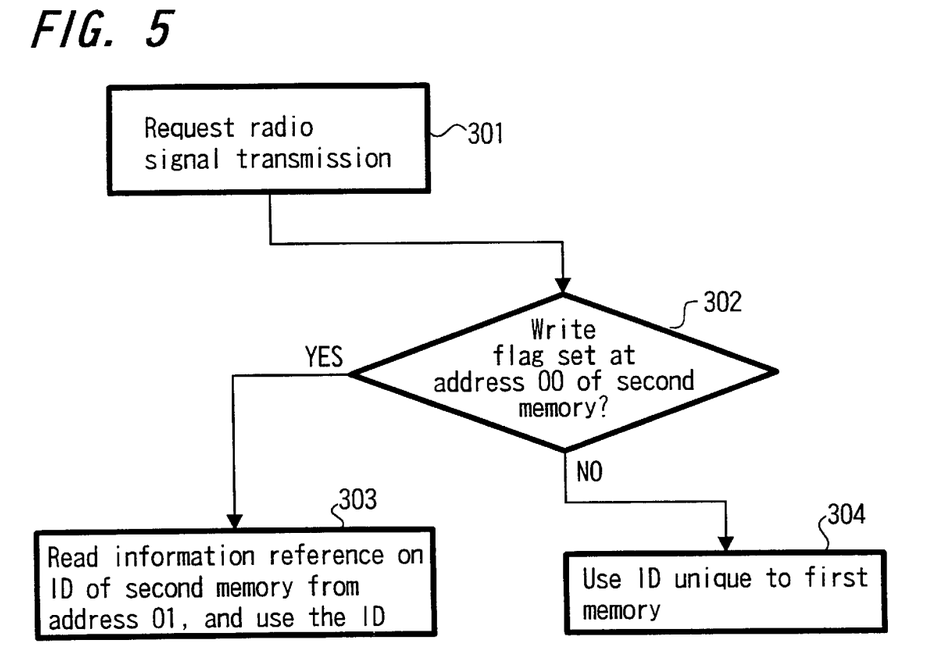
FIG. 5 is a flowchart showing the process of an ID selection at the time of radio transmission according to the embodiment.

Now, the process of selecting the ID used for requesting a radio wave transmission to an external line or the like from each handset unit will be explained with reference to the flowchart of FIG. 5. In the case where the radio wave transmission is requested (step 301), it is judged whether or not a write complete flag is set at the address 00 of the second memory 22 of the handset unit (step 302). If the write complete flag is set, the ID information written in the second memory 22 is read out from its address 01 and the transmission request process is performed by using the particular ID (step 303). The ID exchange process which may be performed in the flowchart of FIGS. 4A and 4B described above corresponds to the process in this step.

In the case where the write complete flag is not set at the address 00 of the second memory 22 of the handset unit, on the other hand, a transmission request process is carried out by use of the unique ID registered in the first memory 21 (step 304). The ID exchange process described with reference to the flowcharts of FIGS. 4A, 4B, if not performed (or the expiration of the time-out period after ID exchange), involves the process in the step.

Figure 6:
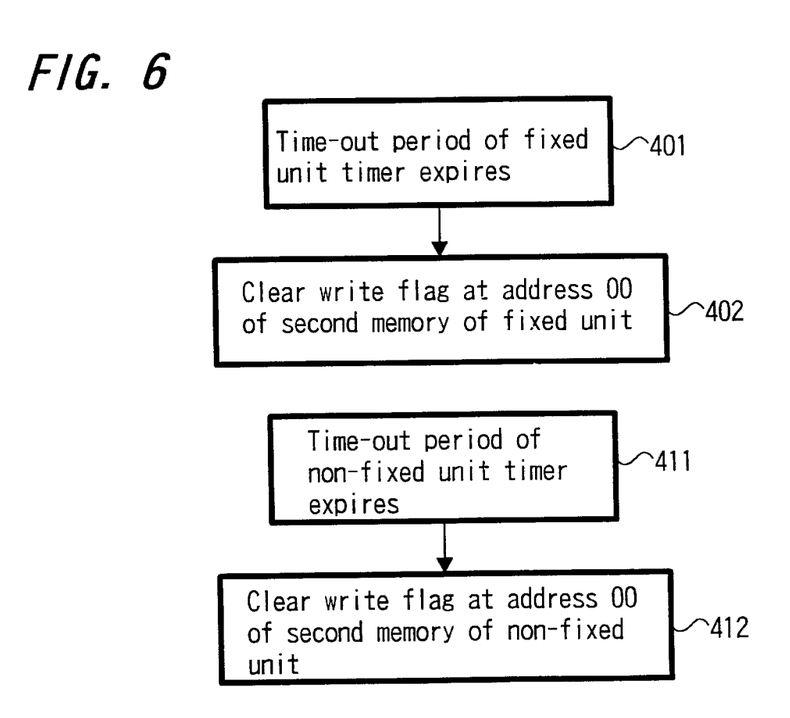
FIG. 6 is a flowchart showing the time-out process according to the embodiment.

Now, the time-out process in the respective handset units 2, 3 will be explained with reference to the flowchart of FIG. 6. In the handset unit 2 specified as a fixed unit in the above-mentioned process, assume that it is decided that the time-out period of the timer started in step 211 (see the flowchart of FIG. 4B) at the time of ID exchange has expired (step 401). The write complete flag set at the address 00 of the second memory 22 of the fixed unit 2 is cleared (step 402). In a similar fashion, in the handset unit 3 specified as a non-fixed unit, assume that the decision is that the time-out period of the timer started in step 208 (see the flowchart of FIG. 4B) at the time of ID exchange has expired (step 411). The write complete flag set at the address 00 of the second memory 22 of the handset unit 3 is cleared (step 412).

Figure 7:
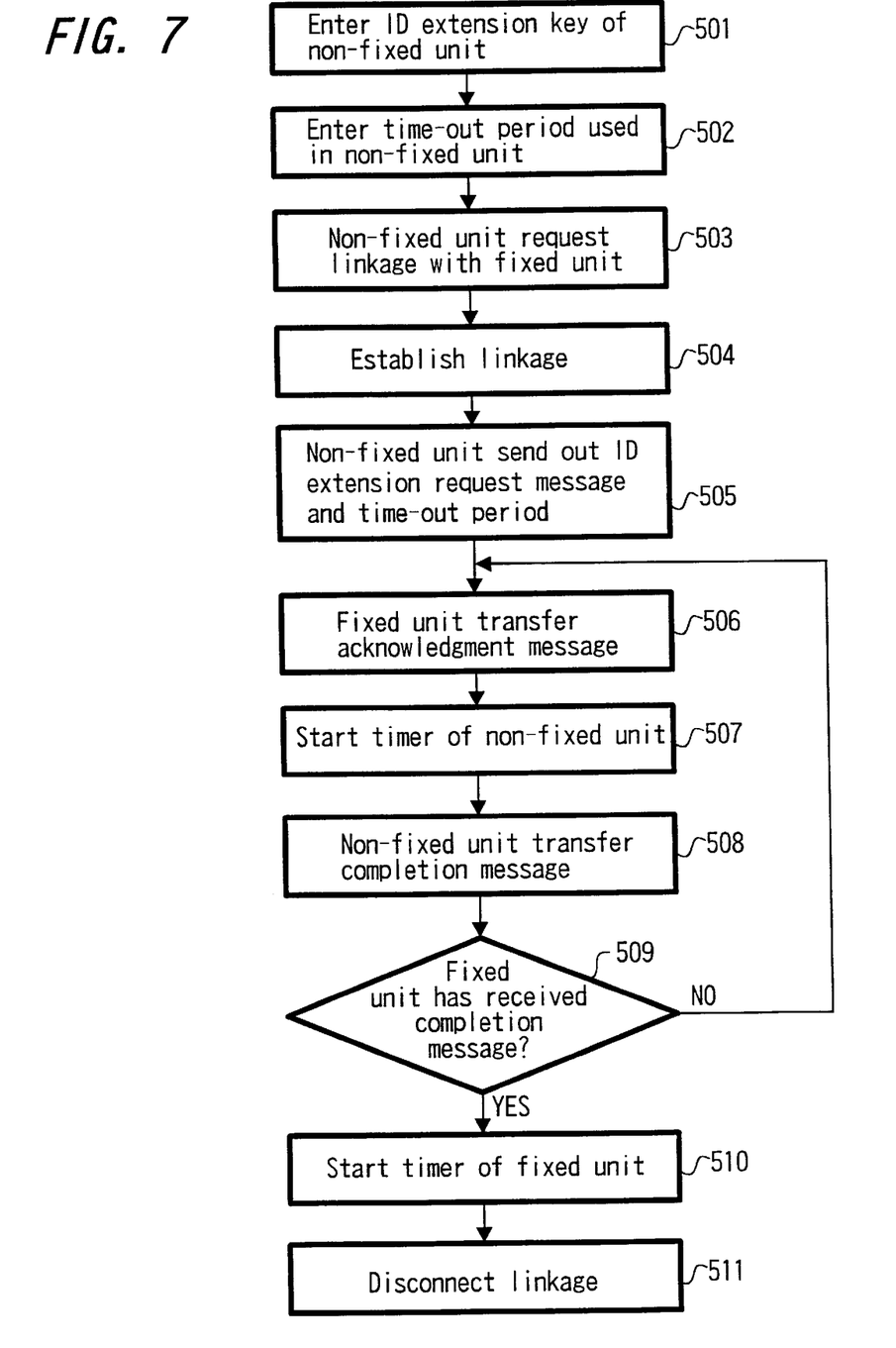
FIG. 7 is a flowchart showing the process of time-out extension according to the embodiment.

The time-out period described above can be adapted to be extended (renewed). FIG. 7 is a flowchart showing the process for it. In the handset unit 3, a key for extending the ID exchange period is operated (step 501), and a time-out period to be extended is entered (step 502) next. The handset unit 3 gives a linkage request to the handset unit 2 (step 503). Upon establishment of the linkage between the handset unit 3 and the handset unit 2 (step 504), an ID extension request message and time-out period data are sent from the handset unit 3 (step 505). Upon receipt of this data in the handset unit 2, the handset unit 2 sends out an acknowledgment message (step 506). In the case where the extension of the time-out period is prohibited, a prohibition message is sent out from the handset unit 2. The handset unit 3, after discriminating the acknowledge message, starts the timer to operate until the expiration of the time-out period thus extended (renewed) (step 507).

As the timer operation of the handset unit 3 is started, the handset unit 3 transmits a completion message (step 508). It is judged in the handset unit 2 whether or not the completion message has been received (step 509). When it is received, the handset unit 2 starts the timer thereof to operate until the expiration of the extended (renewed) time-out period (step 510), and disconnects the linkage with the handset unit 3 thereby to complete the extension (renewal) process (step 511). In the case where the completion message can not be received in step 509, the process is repeated from step 506 for the transmission of the acknowledgment message.

The process for extending (renewing) the time-out period shown in the flowchart of FIG. 7 is performed by connecting the handset units 2 and 3 and thereby making possible a direct radio communication between them. As an alternative, the handset unit 2 may be connected to the handset unit 3 through a public telephone line for carrying out the extension of the time-out period. In other words, the handset unit 3 for which the ID has been exchanged can be used as a PHS terminal before expiration of the time-out period. Therefore, the handset unit 2 is called through the public telephone line by the base unit 1 and data is transmitted for extension by transmitting the signal as a PHS terminal. In such a case, each data is transmitted by the DTMF signal whereby the time-out period can be extended with a comparatively simple control operation.

As described above, in the cordless telephone apparatus according to this embodiment, the identification code is exchanged between the first handset unit 2 and the second handset unit 3 with the first handset unit 2 registered as a PHS terminal. Then, the second handset unit 3 can be used as a PHS terminal as long as the identification code exchanged remains effective, thus making it more convenient to the apparatus as a radio telephone. In other words, a cordless telephone handset unit suitable for use in a fixed unit is employed as the first handset unit 2, and a cordless telephone handset unit suitable for portable application is used as the second handset unit 3. In this way, the second handset unit 3 is used as a PHS terminal only when the user is out, while when an incoming call arrives at the PHS system while he is staying in his home (though limited to the case in which the radio wave from the PHS public base station arrives at the first handset unit 2), on the other hand, the first handset unit 2 can receive the incoming call. Thus, the two telephone sets can thus be selectively used appropriately.

In this embodiment, an identification code is exchanged between two telephone sets, so that before expiration of the time-out period after exchange, the first handset unit 2 (fixed unit 2) specified as a fixed unit acts as a terminal not registered as a PHS terminal. As viewed from a common carrier of the PHS, therefore, there are not existent a plurality of terminals of the same identification number and no problem is posed on the part of the common carrier. Also, since only one unit is registered in the common carrier, the basic rate representing the cost required for the telephone line maintenance is charged only for a single unit but not for a plurality of units.

Should the second handset unit 3 be lost with the identification code exchanged with the second handset unit 3, the intentional abuse of the handset unit 3 as a PHS terminal can be minimized. Specifically, once the time-out period expires, the handset unit 3 cannot be used as a PHS terminal unless renewed, thereby making it possible to prevent the abuse effectively.

According to this embodiment, the identification code stored in the second memory 22 of the second handset unit 3 by the exchange process is automatically erased as the remaining capacity of the battery of the second handset unit 3 is reduced below a predetermined value. In the case where the terminal is left to stand, therefore, the identification code data is lost and therefore the abuse of the stored identification codes can be effectively prevented.

On the other hand, assume that the capacity of the battery has not been completely consumed. If the central processing unit 20 in the terminal is tampered (for example, the time-out period is intentionally extended), the refresh pulse which otherwise might be generated based on the clock of the central processing unit 20 ceases to be generated and the data stored in the second memory 22 is lost. This also contributes to an effective prevention of the abuse of the identification code stored in the memory.

In the above-mentioned embodiment, the identification code is exchanged between two handset units of the cordless telephone used in combination with a base unit connected to the public telephone line. Alternatively, an arrangement can be made in which only two terminals corresponding to the handset units 2, 3 are provided and only one of them can be used as a dedicated terminal of the PHS system.

Also, instead of exchanging the identification code between two terminals with the fixed unit having another identification code as in the above-mentioned embodiment, the fixed unit can execute the process only for prohibiting the use of the identification code set therein.

Further, although the time-out period is set at the time of identification code exchange according to the above-mentioned embodiment, the effective time period obtained by each identification code exchange may be set to a predetermined time period. Also, a time-out period can be specified directly in terms of date, hours and minutes, instead of in terms of an effective length of time after the lapse of which the time-out period expires.

Also, instead of applying the invention to a terminal connected to a radio communication network called the PHS according to the above-mentioned embodiment, the invention is of course applicable to a terminal connected to other various types of radio communication networks with equal effect.

According to the present invention, a specific identification code assigned to a first terminal is assigned also to a second terminal to be connected to a predetermined communication network. It is thus also possible to use an arbitrary one of the terminals provided according to a particular application, thereby improving the operating convenience of a communication terminal. In the case where a specific identification code is set at the second terminal, the use of the first terminal is intentionally limited. The case never occurs, therefore, in which a plurality of terminals that can use a specific identification code at the same time are coexistent. As viewed from the party responsible for management of the communication network, therefore, only a single terminal appears to exist for each identification code, thus posing no problem of connection with a communication network.

Also, in the above-mentioned case, the specific identification code set at the second terminal can be used only for a predetermined period of time, and after the lapse of the predetermined period of time, the specific identification code can be used at the first terminal. The use of the second terminal can thus be limited and the abuse of the second terminal which otherwise might occur when it is lost or stolen can be prevented.

Further, the period during which the identification code set at the second terminal can be used is a period specified by the first terminal when the specific identification code is set at the second terminal. The period during which the second terminal can be used, therefore, can be freely set by the first terminal. When the second terminal is carried by a person going out of his home, for example, the period corresponding to the time he is out is set, thereby making it possible to effectively prevent the abuse of the second terminal whenever it is lost or stolen. At the same time, the time during which the use of the first terminal is limited can be minimized.

Furthermore, in the above-mentioned case, the period during which the second terminal is usable can be extended or renewed by using the data transmitted from the first terminal. The second terminal can thus be used over a long period of time in simple fashion.

What is more, the specific identification code set at the second terminal is erased when a predetermined operation is performed on the second terminal. The abuse of the identification code set at the second terminal can thus be effectively prevented.

In addition, the specific identification code set at the second terminal is erased when the second terminal is disconnected from the power supply thereof. In the case where the second terminal is left to stand, therefore, the set identification code data is automatically erased, thereby effectively preventing the abuse of the particular identification code.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A radio communication apparatus comprising:

a first radio terminal including a first memory for storing identification code data for use in connecting to a predetermined communication network and first control means for reading said identification code data from said first memory in accordance with an operation of operating means and for transmitting said identification code data by transmission means; and a second radio terminal including a second memory and second control means for receiving said identification code data by receiving means and for storing said identification code data in said second memory, wherein said second radio terminal is connected to said predetermined communication network by storing said identification code data in said second memory of said second radio terminal, and said first radio terminal is prohibited from being connected to said predetermined communication network, and wherein said second radio terminal further includes a timer set with a time-out period, and said second control means includes means for erasing said identification code data of said second memory in accordance with an output of said timer for prohibiting the connection of said second radio terminal to said predetermined communication network.

2. The radio communication apparatus according to claim 1, wherein said time-out period is input using said operating means at said first radio terminal and is transmitted to said second radio terminal.

3. The radio communication apparatus according to claim 2, wherein said time-out period set in said timer of said second radio terminal can be one of extended and renewed with permission from said first radio terminal.

4. The radio communication apparatus according to claim 2, wherein said first radio terminal includes a second timer, said time-out period is set in said second timer, and prohibition of a connection of said first radio terminal to said predetermined communication network is canceled by said first control means in accordance with an output of said second timer.

5. The radio communication apparatus according to claim 1, wherein a content stored in said second memory is erased if a source voltage of said second radio terminal drops below a predetermined value when said identification code data is stored in said second memory of said second radio terminal.

6. The radio communication apparatus according to claim 1, wherein a content stored in said second memory is erased if a predetermined operation is performed on said second radio terminal when said identification code data is stored in said second memory of said second radio terminal.

7. The radio communication apparatus comprising:

a first radio terminal including a first memory for storing identification code data for use in connecting to a predetermined communication network and first control means for reading said identification code data from said first memory in accordance with an operation of operating means and for transmitting said identification code data by transmission means; and a second radio terminal including a second memory and second control means for receiving said identification code data by receiving means and for storing said identification code data in said second memory, wherein said second radio terminal is connected to said predetermined communication network by storing said identification code data in said second memory of said second radio terminal, and said first radio terminal is prohibited from being connected to said predetermined communication network, and wherein said first memory of said first radio terminal includes means for storing second identification code data for using said first radio terminal as a handset unit, said first radio terminal includes a third memory, said second radio terminal includes a fourth memory for storing third identification code data for using said second radio terminal as a handset unit, said second control means of said second radio terminal reads said third identification code data from said fourth memory and transmits said third identification data to said first radio terminal after said second identification code data is stored in said second memory, and said first control means of said first radio terminal stores said third identification code data in said third memory for prohibiting the connection of said second radio terminal to said predetermined communication network.

* * * * *